United States Patent
Louthan et al.

[11] Patent Number: 6,125,813
[45] Date of Patent: Oct. 3, 2000

[54] PRECHAMBER COMBUSTION FOR A ROTARY DIESEL ENGINE

[75] Inventors: Leonard J. Louthan, Baltimore; Michael J. Griffith, Phoenix, both of Md.

[73] Assignee: Patrick Power Products, Inc., Elk Ridge, Md.

[21] Appl. No.: 08/871,671

[22] Filed: Jun. 9, 1997

[51] Int. Cl.[7] .............................. F02B 53/10; F02B 19/16
[52] U.S. Cl. ..................... 123/209; 123/210; 123/254; 123/268; 123/270; 123/272
[58] Field of Search ............................ 123/209, 210, 123/268, 270, 271, 222, 281, 282, 284

[56] References Cited

U.S. PATENT DOCUMENTS

| | | |
|---|---|---|
| 2,719,514 | 10/1955 | Schilling . |
| 2,739,578 | 3/1956 | Stump . |
| 3,053,238 | 9/1962 | Meurer . |
| 3,058,452 | 10/1962 | Espenschied . |
| 3,216,404 | 11/1965 | Peras . |
| 3,270,719 | 9/1966 | Hamada . |
| 3,508,530 | 4/1970 | Clawson . |
| 3,782,337 | 1/1974 | Feller . |
| 3,957,021 | 5/1976 | Loyd, Jr. . |
| 3,976,036 | 8/1976 | Muroki et al. ...................... 123/209 |
| 3,980,056 | 9/1976 | Kraus . |
| 4,083,329 | 4/1978 | Myers . |
| 4,084,549 | 4/1978 | Satow . |
| 4,091,789 | 5/1978 | Jones . |
| 4,096,828 | 6/1978 | Satou et al. . |
| 4,108,136 | 8/1978 | Hideg et al. . |
| 4,162,669 | 7/1979 | Igashira et al. ...................... 123/210 |
| 4,237,845 | 12/1980 | Kato et al. . |
| 4,259,932 | 4/1981 | Hideg et al. . |
| 4,414,940 | 11/1983 | Loyd . |

FOREIGN PATENT DOCUMENTS

| | | |
|---|---|---|
| 0025298 | 3/1981 | European Pat. Off. . |
| 0068104 | 1/1985 | European Pat. Off. . |
| 0226348 | 6/1987 | European Pat. Off. . |
| 0412659 | 2/1991 | European Pat. Off. . |
| 1334873 | 12/1963 | France . |
| 1383079 | 11/1964 | France . |
| 1383913 | 11/1964 | France . |
| 1385487 | 12/1964 | France . |
| 1385687 | 12/1964 | France . |
| 1386811 | 12/1964 | France . |
| 1503342 | 10/1967 | France . |
| 1509806 | 12/1967 | France . |
| 1557989 | 1/1969 | France . |
| 2100795 | 6/1971 | France . |
| 2183295 | 1/1973 | France . |
| 2199062 | 9/1973 | France . |
| 57104712 | 6/1982 | Japan . |
| 947284 | 1/1964 | United Kingdom ................. 123/209 |
| 1068209 | 5/1967 | United Kingdom . |
| 2097856 | 11/1982 | United Kingdom . |

*Primary Examiner*—Michael Koczo
*Attorney, Agent, or Firm*—Liniak, Berenato, Longacre & White, LLC

[57] ABSTRACT

A fuel injection, ignition, and combustion system for use in a rotary internal combustion engine of the diesel type and method of power extraction is provided. The fuel combustion system includes a rotary engine with a prechamber disposed in a top center position of the engine housing. The prechamber includes means within the prechamber for maintaining a surface in the prechamber at a temperature sufficient to cause ignition of the fuel. In operation, unthrottled air is introduced into the housing and compressed in the top center position of the engine housing. Fuel is introduced into the prechamber via a fuel injector disposed within the prechamber which ignites due to the hot surface and initiates combustion. The engine continues to operate by retaining the surface of the prechamber at a high temperature which initiates subsequent combustion cycles.

21 Claims, 5 Drawing Sheets

PRECHAMBER COMBUSTION FOR A ROTARY DIESEL ENGINE

FIELD OF THE INVENTION

The present invention relates to a prechamber fuel combustion system for use in a rotary internal combustion engine of the heavy fuel type. More specifically, the present invention relates to a fuel combustion system for use in a rotary internal combustion engine of the direct fuel injection type which includes a prechamber and an associated combustion aid for initial combustion of the fuel within the prechamber, and complete combustion within the main chamber.

BACKGROUND OF THE INVENTION

Improvements to the Wankel rotary engine to permit operation with heavy fuels have been attempted. Direct injection, stratified charge, and prechambers have been used in rotary engines to permit operation with heavy fuels. A prechamber may be located in the engine housing, separate from the main chamber. Fuel ignited in the prechamber is then flashed into the working chamber, in order to ignite the main fuel charge.

High compression ratios have been employed to achieve proper functioning of diesel powered internal combustion engines. In compression-ignition systems, the diesel fuel is ignited by the heat of compression alone, with compression ratios typically of between about 14:1 to about 20:1. Due to the geometry of a rotary engine, high compression ratios are impractical to attain. While it is possible to design the geometry of the engine to attain a high compression ratio, rotary engines of this type have not been successful. For instance, to provide a sufficiently high compression ratio, the geometry is modified so that it is long and narrow, which results in small displacement for the size of the engine. In addition, high compression ratios in rotary engines cause high mechanical loads requiring heavy components. This defeats the major size and weight advantage the engine has over piston engines.

Attempts to design a rotary engine operating on the compression-ignition principle have resulted in complex designs, none of which have achieved commercial practicality. For example, in U.S. Pat. No. 3,957,021 to Loyd, a compressor is used to supply a separate air charge into the prechamber in order to initiate combustion. The compressor adds cost and complexity to the engine design. Moreover, compressed air must be released at timed intervals, thus further complicating matters. Similarly, U.S. Pat. No. 4,091,789 to Jones discloses a stratified charge rotary engine requiring two injectors and a timed spark ignition source. This engine operates at relatively low compression ratios but requires two timed injectors per rotor and a timed electrical spark.

A rotary engine is advantageous because of its size, weight, and relative simplicity. A commercially practicable heavy fuel rotary engine would have applicablity wherever low volatility fuel is an advantage or where unthrottled operation yields a thermal efficiency advantage.

Thus, there is a need in the art for a rotary engine which achieves stable combustion of heavy fuel at relatively low compression ratios. Similarly, there is a need in the art for a practical Wankel rotary engine with a relatively low compression ratio, which will achieve consistent ignition of the fuel/air charge using direct fuel injection, without requiring complex auxiliary components.

SUMMARY OF THE INVENTION

A principal object of the present invention is a rotary engine which achieves stable combustion of heavy fuel at low compression ratios.

A further object of the present invention is a practical Wankel rotary engine with a low compression ratio achieving consistent ignition of the fuel/air charge using direct fuel injection without the requirement for complex auxiliary components to promote combustion of the fuel.

Yet another object of the present invention is a rotary engine of the heavy fuel type which retains the heat of combustion in order to aid in ignition of the following cycle.

The above objects are achieved according to the present invention.

A fuel injection ignition and combustion system for a rotary internal combustion engine, which uses heavy fuels, includes a trochoidal shaped housing and a triangular rotor. The housing has an intake port for inducting an unthrottled air charge into a rotor chamber where the motion of the rotor closes the port near maximum volume. The chamber decreases in volume as the rotor continues to rotate, compressing the air sufficiently to support an efficient combustion process. Near minimum volume top center rotor position, fuel is injected into the air charge. A hot surface, glow plug or prechamber surface, supplies sufficient heat to ignite the initial quantity of fuel within the prechamber where a local chemically correct fuel/air mixture can be assured. As fuel continues to inject, the over-rig mixture discharges from the prechamber into the main chamber where addition of air insures the complete combustion of all fuel. The combustion raises chamber pressure and temperature forcing the rotor to rotate and transmit positive torque to the crankshaft. The rotor rotation expands the chamber volume until maximum volume is reached and the rotor exposes the exhaust port in the housing so the burned gasses can be discharged. Near minimum chamber volume, the intake port is exposed due to continued rotor rotation and the four stage cycle is repeated. Simultaneously to the described chamber events, the other two faces of the triangular rotor pass through the same events, each 120° out of phase with each other.

A method of fuel combustion includes the step of providing a rotary engine with a prechamber disposed in a top center position of the engine housing. The prechamber is self-purging and includes means for maintaining a surface within the prechamber at a temperature sufficient to cause ignition of the fuel introduced therein. Air is introduced to one of the working chambers through the air induction port during the induction stroke of the engine. The air is compressed during the compression stroke of the engine. Fuel is introduced near the end of the compression stroke of the engine into the prechamber via a fuel injector. Combustion of the fuel/air mixture causes expansion, resulting in a torsion loading of the crankshaft. The combustion products are expelled from the engine through an exhaust port during the exhaust stroke of the engine.

These and other objects and advantages of the invention will become readily apparent in view of the following description and drawings of the above-identified invention.

BRIEF DESCRIPTION OF THE DRAWINGS

The above and other objects and advantages and novel features will become apparent from the detailed description of the preferred embodiment of the invention illustrated in the accompanying drawings, wherein.

DETAILED DESCRIPTION OF THE PREFERRED EMBODIMENT

Figure 1:
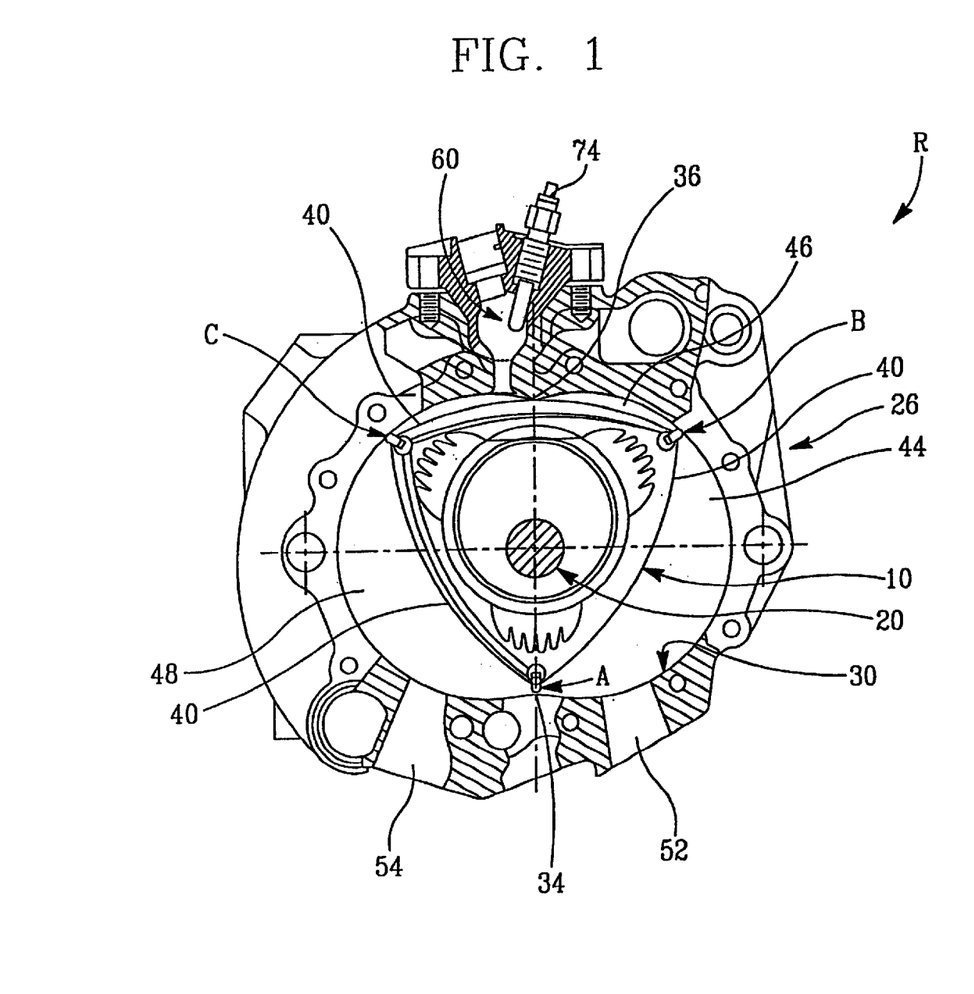
FIG. 1 is a cross-sectional view of a rotary engine of the present invention.

As best shown in FIG. 1, engine R is of the Wankel type, such as disclosed in U.S. Pat. No. 2,988,065, to Wankel et al., the disclosure of which is incorporated herein by reference. In general, rotary engine R operates on the 4-cycle engine operation of intake, compression, expansion, and exhaust phases. Compression and expansion of the working medium are accomplished by rotor 10 mounted eccentrically on engine output shaft 20.

Rotary engine R includes housing 26 which forms the outer boundary of main chamber 30. Housing 26 defines a cavity having two symmetric lobes which meet at epitroichoidal lobe junctures 34 and 36. Rotor 10 is generally triangular in section, and has three face portions 40 meeting at apex seal junctions A, B, and C. Rotor 10 and housing 26 define within chamber 30 three separate working chambers 44, 46, and 48. The volume within the working chambers successively expand and contract, in well known manner, as rotor 10 rotates within housing 26. Rotor 10 and working chambers 44, 46, and 48 are sized to provide a compression ratio of between about 6:1 and about 11:1. Ports 52 intake and 54 exhaust are located in the bottom center or lower portion of housing 26 to facilitate induction of air and exhaustion of combustion products, respectively. Specifically, port 52 is an air induction port, for introducing unthrottled air to working chamber 44 during the intake stroke of the cycle. That is, the flow of air is not restricted in the engine R. Port 54 is an exhaust port, for expelling the combustion products from working chamber 48 during the exhaust stroke.

In order to achieve combustion of the heavy fuel, a prechamber 60 is provided. Prechamber 60 is located generally opposite from ports 52 and 54, preferably within about 15° circumferentially, either clockwise or counterclockwise, of lobe junction 36. The prechamber 60 should be located in a top center position of housing 26 so that it communicates with working chamber 46 at the end of the compression stroke.

Locating the outlet of the prechamber 60 within 15° of lobe junction 36 assures proper functioning of the engine and appropriate purging of prechamber 60. Prechamber 60 should not be too close to the exhaust portion 54, because the necessary pressure differentials will not be maintained because the fuel/air mixture would be expelled before the fuel is fully combusted. Similarly, prechamber 60 should not be too close to intake port 52, because the combustion pressure would inhibit rather than promote further rotation of rotor 10.

Figure 2:
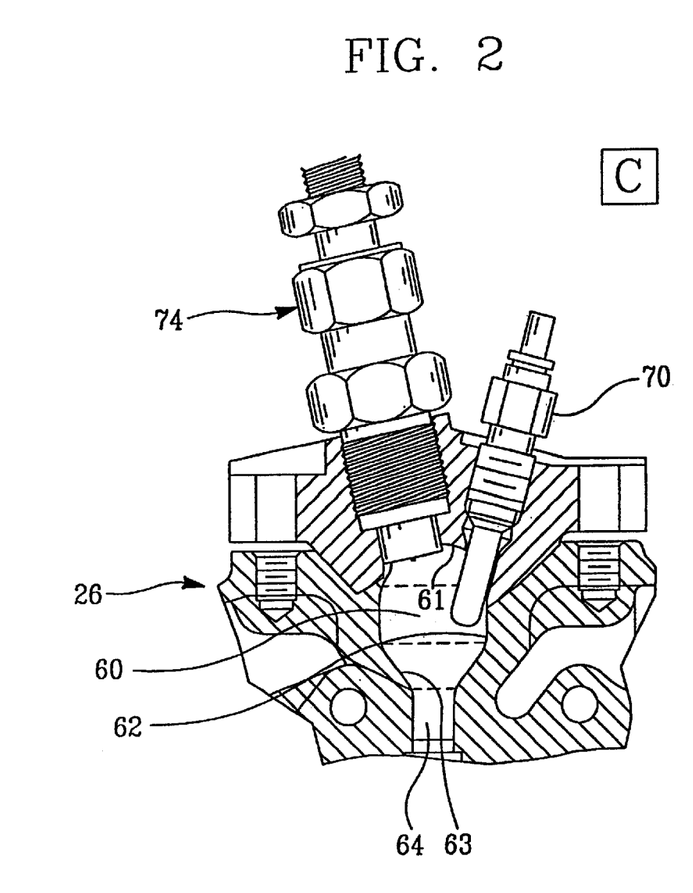
FIG. 2 is a fragmentary cross-section of a first embodiment of the prechamber of the present invention.

As best shown in FIG. 2, prechamber 60 includes a top semi-spherical portion 61, a cylindrical portion 62, and a frustoconical bottom portion 63. Those skilled in the art will appreciate that prechamber 60 may have other shapes. The volume of prechamber 60 is preferably about 25% to about 40% of the total minimum volume of working chamber 46. When rotor 10 is positioned such that a face portion 40 is centered at lobe juncture 36 at the top center position of housing 26, the working volume of working chamber 46 is at its minimum. This volume is defined as the clearance volume, and it includes the volume of any depressions in face portion 40.

Prechamber 60 communicates with main chamber 30 through cylindrical passage 64. Passage 64 permits a transfer of air charge from working chamber 46 into prechamber 60 prior to combustion, and the expulsion of uncombusted fuel and combustion products from prechamber 60 to the working chamber 46 after the initiation of combustion. Passage 64 should not be so small as to prevent prechamber 60 from not filling or purging fully. Conversely, passage 64 should not be so large so as to essentially become an open chamber. The prechamber preserves a concentrated fuel/air mixture at all power levels to insure consistent ignition. It was surprisingly discovered that the ideal ratio of the diameter of the cylindrical passage 64 to the diameter of a sphere having an equivalent volume to the prechamber 60 volume is between about 0.20 and 0.32.

In order to initiate combustion in prechamber 60, fuel injector 74 and glow plug 70 are provided. Glow plug 70 is used under starting as a hot surface where heavy fuel will ignite when the fuel is injected into prechamber 60. The geometry and the compression ratio of the rotary engine R are such that combustion of fuel will not occur if glow plug 70 becomes inoperative during starting. It was surprisingly discovered that under the conditions noted herein, rotary engine R will continue to operate if the temperature of a surface in prechamber 60 is maintained at a sufficiently elevated level: The invention has as its purpose readily implemented, non-complex means for maintaining this temperature.

A first way is to continually operate glow plug 70 to maintain a hot surface in prechamber 60, as best shown in FIG. 2. In that event, the surface temperature of glow plug 70 should be maintained at a temperature consistent with achieving short reaction times for the fuel being combusted. It is the maintenance of short reaction times, generally less than 1 millisecond, that permits the combustion cycle to be completed in an efficient manner. In addition, glow plug 70 is exposed to and will be heated by the combustion process occurring within prechamber 60, changing the electrical energy required to maintain its temperature high enough to ensure ignition. An electrical controller C may be used to balance the two heat inputs to glow plug 70. Preferably, controller C maintains the glow plug 70 at a temperature of about 900° C. to about 950° C. While glow plug 70 is effective for initiating combustion in prechamber 60 which thereafter is completed within main chamber 30 in rotary engine R, continuous operation of glow plug 70 is relatively complex. Thus, alternative ways of maintaining the requisite hot surface in the prechamber may be used in combination with glow plug 70, or separately.

Figure 3:
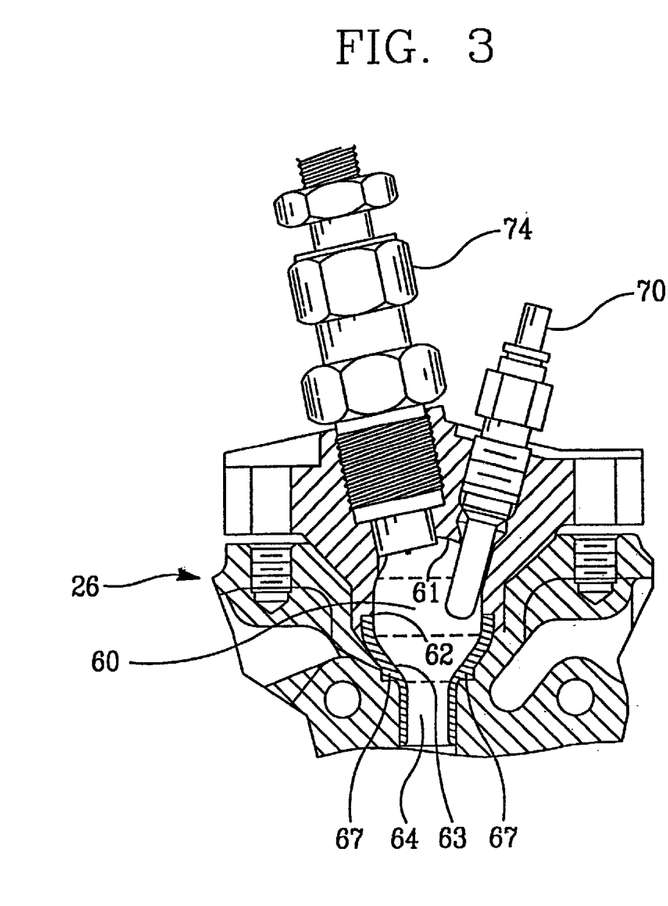
FIG. 3 is a fragmentary cross-sectional of a second embodiment of the prechamber of the invention.

As best shown in FIG. 3, prechamber 60 may be designed to retain thermal energy from combustion cycle to combustion cycle, thereby reducing ignition delay. In this embodiment, the lower section of cylindrical portion 62 of prechamber 60 and conical portion 63 of prechamber 60 are made from a material having low thermal conductivity. Passage 64 is also made from a low thermal conductivity material. The low thermal conductivity material is generally designated by numeral 67. The low thermal conductivity material 67 serves as a hot surface to retain combustion heat and facilitate ignition of future injections. Thermal energy is retained for thus maintaining surface 67 at an elevated temperature. The low thermal conductivity material 67 must also retain its strength and shape at the elevated temperatures. Materials like stainless steel or ceramics may be used to accomplish this thermal isolation.

It would be preferable to construct the prechamber 60 entirely with a low thermal conductivity material to maximize heat retention, but injector 74 should be maintained at relatively low temperatures. Thus, the upper section of cylindrical portion 62 and semispherical portion 61 of prechamber 60 are preferably made of aluminum or other metal which are good thermal conductors. Because of the differing conductivities, the top section of prechamber 60, in which glow plug 70 and fuel injector 74 are placed, is maintained at a relatively low temperature, while the thermally insulated lower portion of prechamber 60 is maintained at a relatively high temperature.

Figure 4:
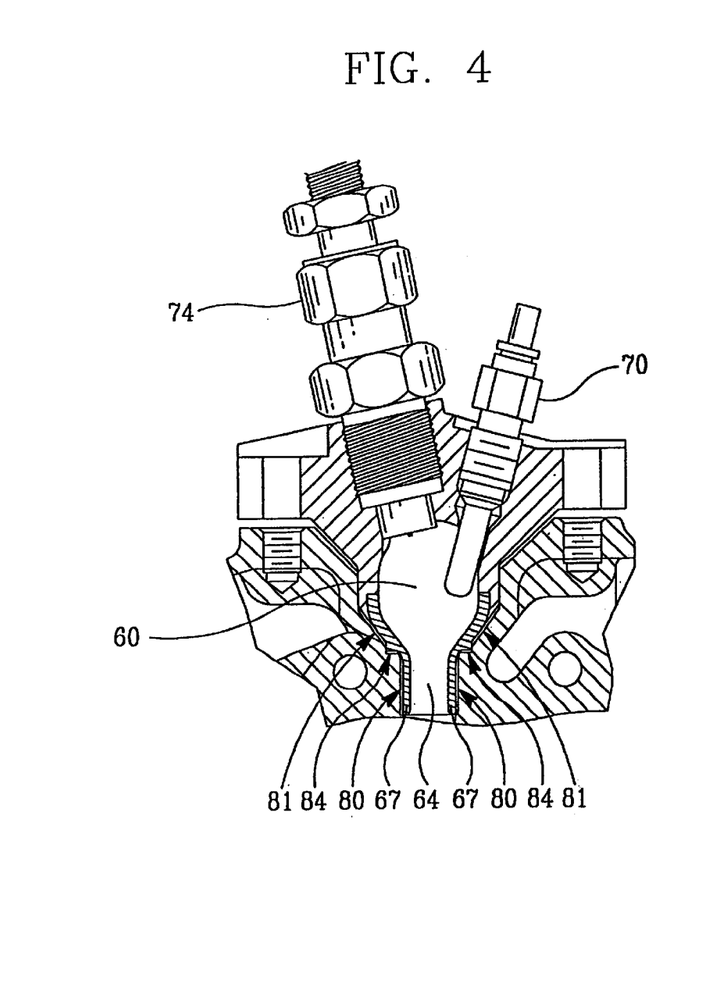
FIG. 4 is fragmentary cross-sectional view of a third embodiment of the prechamber of the invention.

In the embodiment of FIG. 4, an air space 80 is disposed between housing 26 and low thermal conductivity material 67. Thus, passage 64 is isolated from the engine housing 26 by air space or air gap 80. In addition, air gaps 81 may surround the frustoconical portion 63 of prechamber 60. The air gaps 80 and 81 provide a good thermal barrier, because air is a relatively poor conductor of heat. Passage 64 is preferably cantilevered out from prechamber 60, so that it does not contact housing 26, resulting in a relatively long path for the conduction of heat.

Static sealing element 84 preferably is disposed between housing 26 and passage 64, to contain the pressure of combustion. Sealing element 84 preferably is a cooper gasket and acts as a pressure seal retaining the requisite pressure for the proper functioning, of rotary engine R.

Figure 5:
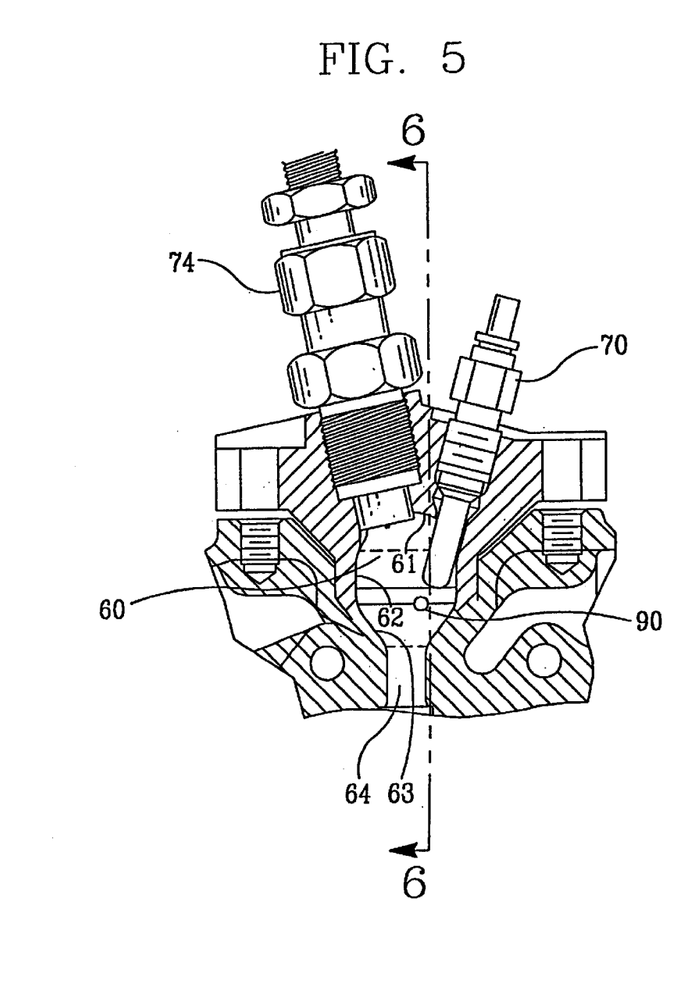
FIG. 5 is a fragmentary cross-sectional view of a fourth embodiment of the prechamber of the invention.
Figure 6:
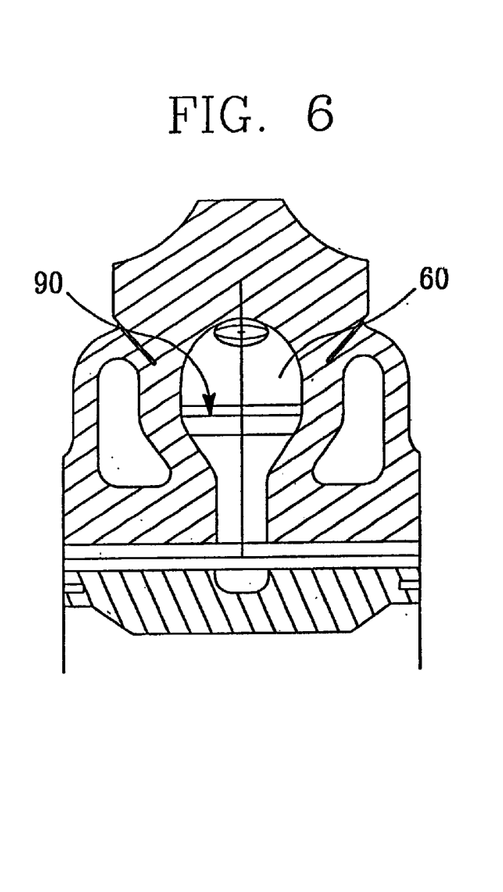
FIG. 6 is a fragmentary cross-sectional view of the prechamber of FIG. 5 taken along the section 6—6 and viewed in the direction of the arrows.

As best shown in FIG. 5, improved combustion and reduced ignition delay may also be achieved by providing a catalyst within prechamber 60. The catalyst-reduces delay time, by providing a surface which reduces the temperature required to react the fuel. A catalyst or low thermal conductivity element 90 is disposed within prechamber 60, preferably press fit across prechamber 60. The rod 90 may be made of a catalytic material, or a catalytic material may be applied to the rod 90. As best shown in FIG. 6, rod 90 is disposed within prechamber 60 and extends transverse to the axis of passageway 64. Alternatively, a catalytic material may be applied to the exposed surfaces of prechamber 60 in any conventional method known in the art to aid in the burning rate of the fuel. Platinum, for example, may be used as the catalytic material. The addition of the catalytic material to prechamber 60 provides a mechanism for the accelerated combustion of the fuel.

While glow plug 70 is needed for start-up of the engine, it thereafter may be optionally operated. The catalyst, if applied to the surface of prechamber 60, need cover an adequate surface area to aid substantially in the combustion process.

Figure 7:
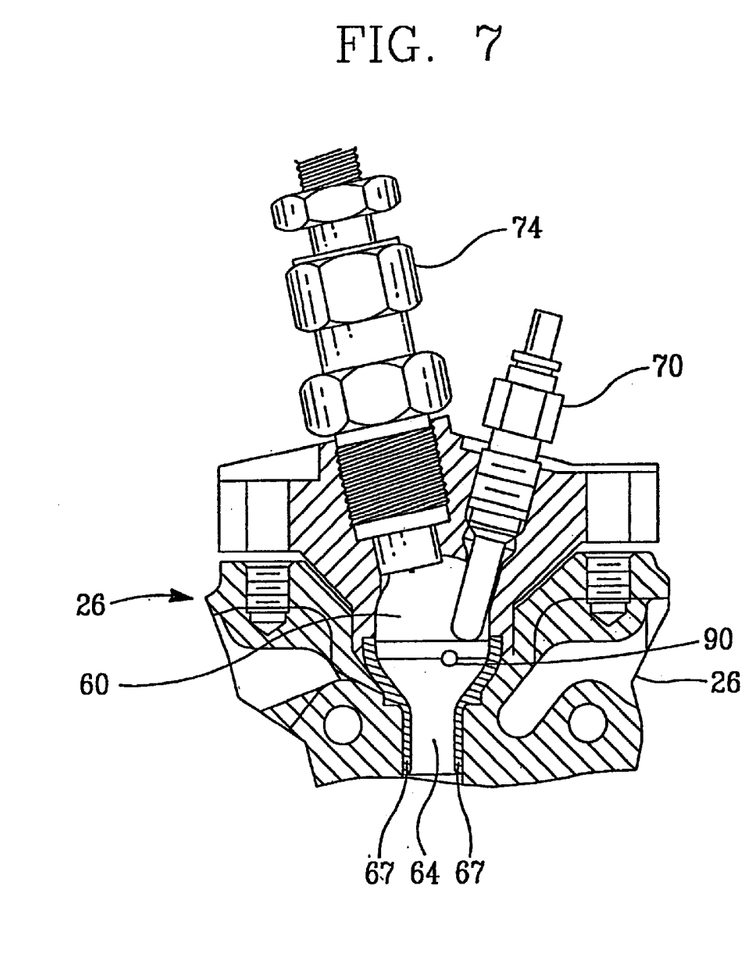
FIG. 7 is a fragmentary cross-sectional view of a fifth embodiment of the invention.

While the addition of a catalytic material to prechamber 60 reduces the temperature required to react the fuel, the prechamber 60 may still lose unacceptable amounts of heat. With reference to FIG. 7, lower portions of prechamber 60 may be made from a low thermal conductivity material 67, again preferably stainless steel. The low thermal conductivity material 67 acts to retain heat within the prechamber 60 to maintain the requisite temperature. While the temperature needed to ignite the fuel is less because of the catalyst, the low thermal conductivity material 67 maintains the combustion heat and helps maintain the high surface temperature. The low thermal conductivity material 67 may be disposed in the prechamber 60 and passage 64 in the same way as illustrated in FIG. 3, and as previously described. Again, the glow plug 70 may be optionally operated in combination with the embodiment of FIG. 6, but need not be operated except for start-up.

Figure 8:
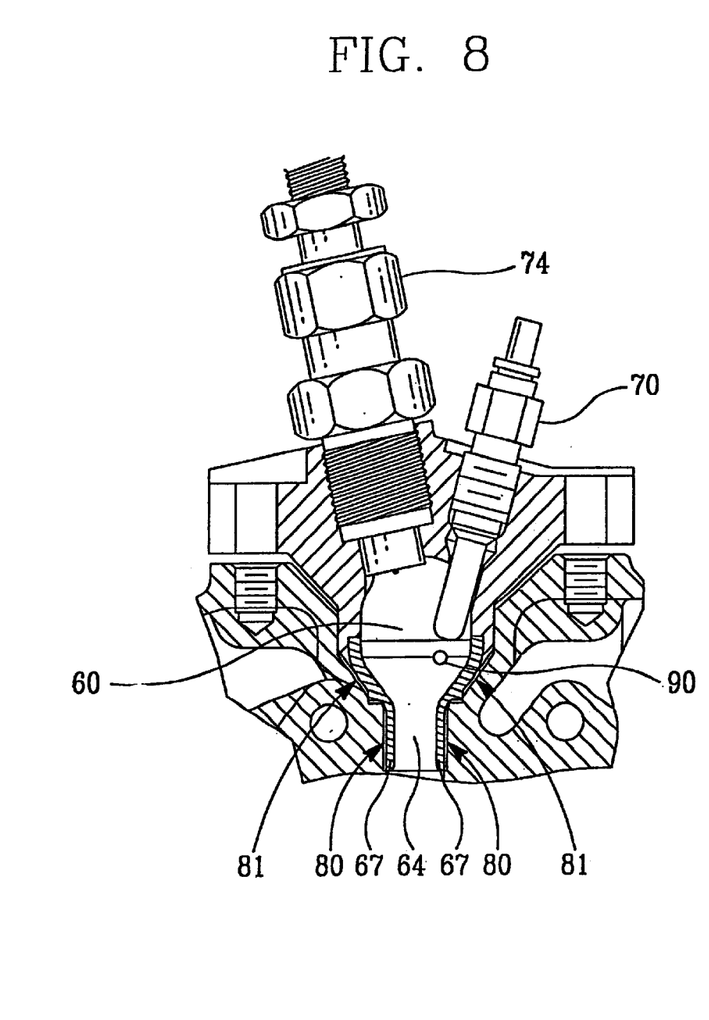
FIG. 8 is a fragmentary cross-sectional view of the preferred embodiment of the invention.

In the preferred embodiment, as best shown in FIG. 8, the insulated air spaces 80 and 81 and low thermal conductivity material 67 may be used in combination with catalyst 90 to maintain the required temperature for combustion within prechamber 60 of the fuel. The air spaces 80 and 81 isolate the prechamber 60, which aids in maintaining the required temperature needed for combustion. The catalyst 90 reduces the temperature to react the fuel. The catalyst 90 and air spaces 80 and 81 are ideal for assuring combustion of the fuel. Finally, while the glow plug 70 is required for start-up of the engine, it may be optionally operated in combination with the embodiment of FIG. 8.

In operation, air is inducted into the engine R through the inlet port 52 as the rotor 10 and the eccentric shaft 20 rotate. As illustrated in FIG. 1, the rotor 10 is moving in a counter-clockwise direction about the centerline of the engine, its motion being influenced by the eccentric shaft 20 and the stationary gear (not shown). The eccentric shaft 20 rotates three times the speed of rotor 10 as maintained by the gear (not shown) in the rotor 10 meshing with the stationary gear. The motion of the rotor 10 causes the apex juncture A to completely pass the inlet port 52. This effectively traps a charge of air between the rotor face 40 and the inner surface of the main chamber 30. As the rotor 10 continues to orbit about the eccentric shaft 20, the volume of this air charge is reduced, causing a rise in the temperature and pressure of the trapped air. The ratio of the maximum volume of the air charge to the minimum volume of the air charge is generally between 9.5:1 and 11:1, though it can vary due to the geometry of the specific engine. The maximum pressure, maximum temperature and minimum volume of the air charge is achieved when the center of the rotor face 40 is aligned with the minor axis of the housing, at juncture 36 of FIG. 1, and is referred to as the top center position.

After juncture A has closed off the inlet port 52, juncture B crosses the passage 64. A portion of the air charge is admitted into the prechamber 60 through the passage 64. During the compression and expansion process, prechamber 60 remains in communication with the air charge via passage 64. When the rotor 10 is near the top center position, fuel is introduced through injector 74 located along the periphery of prechamber 60. While only one fuel injector 74 is shown, it should be understood that a plurality of fuel injectors may be used to improve the distribution of the fuel within rotary engine R. The quantity of fuel injected controls the power output of the engine R. The timing of the fuel injection relative to the position of the rotor 10 is determined by the operating conditions of the engine. In this invention, the fuel begins the process of combustion due to the pressure of the high temperature surfaces or catalysts as well as the temperature and pressure of the air charge. At starting, however, when the engine components are relatively cool, air charge temperature is too low to initiate the fuel combustion. A glow plug 70 is located within prechamber 60 and provides a high temperature surface that will initiate the combustion process.

In all operating conditions, the charge air temperature and pressure are insufficient to initiate combustion of the fuel. Thus, thermal conditions within prechamber 60 and the fuel/air mixture promote the burning of the fuel with air, initiating the combustion process. Specifically, a hot surface must be in close proximity to a local chemically correct fuel/air mixture to cause ignition of the injected fuel.

After combustion has been initiated, the release of chemical energy from the fuel results in a rapid rise in the temperature and pressure of the compressed air charge. The expanding air charge within the prechamber 60 must exit through the passage 64. This action results in the addition of kinetic energy to the unburned fuel still within the prechamber 60, and increases the mixing of the fuel with the air charge. The resultant rise in pressure, as the fuel is consumed, forces the rotor 10 to turn about the eccentric shaft 20. The resultant torque may be extracted from the eccentric shaft 20 and used to accomplish useful work. As the air charge and the fuel are consumed, the products of combustion are formed.

As the rotor 10 and eccentric shaft 20 rotate, the apex juncture B will cross the exhaust port 54. This causes the pressure of the combustion charge to drop to the relatively low pressure within the exhaust port 54. The products of combustion then exit the engine through exhaust port 54. The pressure within the prechamber 60 drops to the pressure of the exhaust port 54, expelling most of the products of combustion within the prechamber 60. After the apex juncture B has crossed the exhaust port, the apex juncture A crosses the passage 64. The main chamber 30 is no longer in communication with the prechamber 60, and the rotor 10 and the eccentric shaft 20 continue to rotate. As the volume of the air charge is reduced, the elements of combustion are expelled out of the engine through the exhaust port 54.

Figure 9:
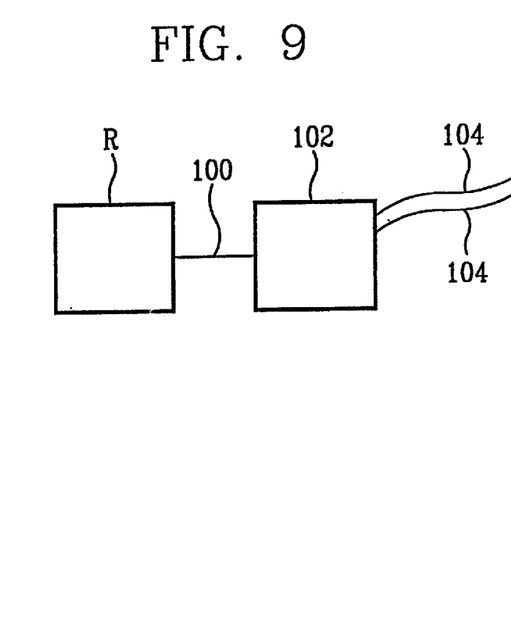
FIG. 9 is a schematic view of the engine of the invention connected to an auxiliary power unit.

As best shown in FIG. 9, engine R according to the invention is operably connected through rotary shaft 100 to auxiliary power unit 102. Auxiliary power unit 102 provides all electrical power through leads 104 to, for example, an aircraft (not shown) in order to permit operation of electrical systems while the aircraft is on the ground at the gate. Because of its small size and weight, the electrical motive system of FIG. 9 can be used with relatively small aircrafts, such as a commuter aircraft in a manner not previously possible. Naturally, engine R may be used to generate other forms of power, such as hydraulic power, etc.

Thus, this engine design achieves combustion of heavy fuels by igniting direct injected fuel with a hot surface, without requiring that the geometry of the engine be changed to create high compression rations. Thus, a practical rotary type engine is provided with a compression ratio which does not cause high mechanical loads yet ignites the fuel/air charge using its own hot surface, without the addition of complex features which promote the combustion of the fuel.

While this invention has been described as having a preferred embodiment, it is understood that is capable of further modifications, uses, and/or adaptations of the invention following the general principle of the invention and including such departures from the present disclosure as come within known or customary practice in the art to which the invention pertains, and as may be applied to the central features herein before set forth, and fall within the scope of the invention and the limits of the appended claims:

We claim:

1. A fuel combustion system for use in a rotary internal combustion engine of the direct injection, heavy fuel type, comprising:
   a. a housing having a cavity to provide three working chambers;
   b. a troichoidal rotor mounted for rotation within said housing, said rotor and said housing defining said three working chambers, said rotor successively expanding and contracting respective volumes within said three chambers during rotation;
   c. an unthrottled air induction port communicating with a first one of said working chambers for communicating air thereto;
   d. an exhaust port juxtaposed to said air induction port communicating with a second one of said working chambers for expelling combustion products therefrom;
   e. a prechamber communicating with a third one of said working chambers, said prechamber disposed generally opposite said air induction and exhaust ports and having a volume about 25% to 40% of a minimum volume of said third one of said working chambers;
   f. a fuel injector disposed within said prechamber for introducing an amount of fuel into said prechamber;
   g. a passage interconnecting said prechamber and said cavity, said passage having an internal open diameter about 20% to 32% of the diameter of a sphere having a volume equivalent to the volume of said prechamber;
   h. an externally powered heating element to ignite said amount of fuel; and
   i. means operably associated with said prechamber for maintaining a surface within said prechamber at a temperature sufficient to cause ignition of said amount of fuel introduced therein, said maintaining means supplementing said heating element to maintain said surface at a sufficiently elevated level to enhance ignition.

2. The fuel combustion system of claim 1, wherein;
   a. said externally powered heating element is a glow plug.

3. The fuel combustion system of claim 2, wherein;
   a. said maintaining means comprises a controller is operably associated with said glow plug for maintaining said glow plug at a temperature between about 900 to about 950° C. thereby maintaining said surface at said sufficiently elevated temperature.

4. The fuel combustion system of claim 1, wherein;
   a. said maintaining means comprises a preselected bottom portion of said prechamber, said bottom portion being made from a low thermal conductivity material.

5. The fuel combustion system of claim 4, wherein;
   a. said material is stainless steel.

6. The fuel combustion system of claim 1, wherein;
   a. said maintaining means includes a catalyst disposed within said prechamber and reducing the ignition temperature of the fuel.

7. The fuel combustion system of claim 6, wherein;
   a. said catalyst is a rod disposed within said prechamber.

8. The fuel combustion system of claim 6, wherein;
   a. said catalyst is comprised of platinum.

9. The fuel combustion system of claim 6, wherein;
   a. said prechamber includes a bottom portion, and said bottom portion is made from a low thermal conductivity material.

10. The fuel combustion system of claim 4, wherein;
    a. said maintaining means includes a thermally isolated region disposed between said housing and said bottom portion.

11. The fuel combustion system of claim 10, wherein;
    a. said prechamber includes a passage communicating with said cavity; and b. a thermally isolated region is disposed between said housing and said passage.

12. The fuel combustion system of claim 11, wherein;

a. at least one of said thermally isolated regions is an insulating air space.

13. The fuel combustion system of claim 11, wherein;

a. said prechamber has a top portion made from aluminum, and said bottom portion is made from stainless steel.

14. The fuel combustion system of claim 1, wherein;

a. said prechamber is located in a top center position of the engine within 15° circumferentially of a line of symmetry disposed between said air and exhaust ports.

15. The fuel combustion system of claim 1, wherein;

a. said rotor and said cavity provide a compression ratio of between about 6:1 to about 11:1.

16. The fuel combustion system of claim 4, further comprising:

a. a glow plug operably associated with said prechamber.

17. The fuel system of claim 4, wherein;

a. said maintaining means further includes a catalyst disposed within said prechamber for reducing the ignition temperature of the fuel.

18. The fuel system of claim 17, wherein;

a. said maintaining means further includes a thermally isolated region disposed between said housing and said bottom portion of said prechamber.

19. The fuel combustion system of claim 10, wherein;

a. said maintaining means further includes a glow plug.

20. The fuel combustion system of claim 10, wherein;

a. said maintaining means further includes a catalyst disposed with said prechamber for reducing the ignition temperature of the fuel.

21. The fuel combustion system of claim 1, wherein said prechamber comprises a top semi-cylindrical portion, a frustoconical bottom portion communicating with a passageway leading to said third one of said working chambers, and an intermediate cylindrical portion intermediate said top semi-cylindrical portion and said frustoconical bottom portion, and wherein said volume is defined by said top portion, said intermediate portion and said bottom portion.

* * * * *